US009444831B1

(12) United States Patent
Lee et al.

(10) Patent No.: US 9,444,831 B1
(45) Date of Patent: Sep. 13, 2016

(54) MALICIOUS SCRIPT DETECTION USING CONTEXT-DEPENDENT SCRIPT EMULATION

(71) Applicant: Trend Micro Incorporated, Tokyo (JP)

(72) Inventors: Charlie Lee, Taipei (TW); Xiaochuan Wan, Nanjing (CN); Xuewen Zhu, Nanjing (CN); Hua Ye, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/920,203

(22) Filed: Oct. 22, 2015

Related U.S. Application Data

(63) Continuation of application No. 12/795,133, filed on Jun. 7, 2010, now abandoned.

(51) Int. Cl.
G06F 21/55 (2013.01)
H04L 29/06 (2006.01)

(52) U.S. Cl.
CPC ....... *H04L 63/1416* (2013.01); *H04L 63/1441* (2013.01)

(58) Field of Classification Search
CPC .................................................. H04L 63/1416
USPC .......................................................... 726/23
See application file for complete search history.

(56) References Cited

U.S. PATENT DOCUMENTS 8,505,094 B1* 8/2013 Xuewen .............. H04L 63/1416
707/687
8,578,499 B1* 11/2013 Zhu ....................... G06F 21/567
713/154
2005/0283835 A1* 12/2005 Lalonde ................ G06F 21/563
726/24
2009/0019105 A1* 1/2009 Sebastian .......... G06F 17/30887
709/202
2009/0292983 A1* 11/2009 Anand ..................... G06F 21/52
715/234
2011/0239294 A1* 9/2011 Kim ...................... G06F 21/566
726/22

OTHER PUBLICATIONS

Jim et al., Defeating Script Injection Attacks with Browser-Enforced Embedded Policies, 2007, WWW, Security, Privacy, Reliability and Ethics:Defending against Emerging Threats, pp. 601-610.*

* cited by examiner

*Primary Examiner* — Peter Shaw
(74) *Attorney, Agent, or Firm* — Okamoto & Benedicto LLP

(57) ABSTRACT

One embodiment relates to a computer-implemented process for detecting malicious scripts at a client computer using a malicious script detector. A web page interceptor intercepts an access of web page data at a universal resource locator address. A script preprocessor determines script fragments embedded in the web page data and extracts variable and function names from the script fragments. A context analyzer determines whether the script fragments reference known-good scripts. The context analyzer may check variable and function names in the script fragment against a database of known-good contexts. Those script fragments which were determined to reference known-good scripts may be categorized as non-malicious. An emulator may perform emulation on remaining script fragments which were not determined to reference known-good scripts and not perform emulation on the script fragments which were determined to reference known-good scripts. Other embodiments, aspects and features are also disclosed.

4 Claims, 4 Drawing Sheets

MALICIOUS SCRIPT DETECTION USING CONTEXT-DEPENDENT SCRIPT EMULATION

REFERENCE TO RELATED APPLICATION

This application is a continuation of U.S. application Ser. No. 12/795,133, mailed on Jun. 7, 2010, which is incorporated herein by reference in its entirety.

BACKGROUND OF THE INVENTION

1. Field of the Invention

The present invention relates generally to computer security, and more particularly, but not necessarily exclusively, to methods and apparatus for detecting malicious computer code.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as "viruses." Antivirus products for protecting computers against malicious codes are commercially available. Experienced computer users have installed some form of antivirus in their computers.

A typical antivirus scanner includes a scan engine and a pattern file. The pattern file comprises patterns for identifying known malicious codes. To check a file for malicious code, the scan engine opens the file and compares its content to patterns in the pattern file. While this pattern matching approach is relatively effective, the pattern file needs to be continually updated to address newly discovered malicious codes. As the number of known malicious codes increases, so does the size of the pattern file. The larger the pattern file, the more memory and processing resources are consumed to perform malicious code scanning. Furthermore, a conventional antivirus scanner has limitations in scanning for scripts (for example, javascripts) on web pages, particularly scripts that are encrypted.

An emulator with heuristic rules may be used at a client (host) computer for detecting encrypted scripts. For example, a full-scale emulation may follow a cycle of preprocessing, tokenization, reduction, compiling and emulating. However, such emulation typically consumes a large amount of processing and memory resources and is disadvantageously slow in performance. This generally makes it impractical or undesirable to perform such emulation at a client computer.

SUMMARY

One embodiment relates to a computer-implemented process for detecting malicious scripts at a client computer using a malicious script detector. A web page interceptor intercepts an access of web page data at a universal resource locator address. A script preprocessor determines script fragments embedded in the web page data and extracts variable and function names from the script fragments. A context analyzer determines whether the script fragments reference known-good scripts. The context analyzer may check variable and function names in the script fragment against a database of known-good contexts. Those script fragments which were determined to reference known-good scripts may be categorized as non-malicious. An emulator may perform emulation on remaining script fragments which were not determined to reference known-good scripts and not perform emulation on the script fragments which were determined to reference known-good scripts. Other embodiments, aspects and features are also disclosed.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
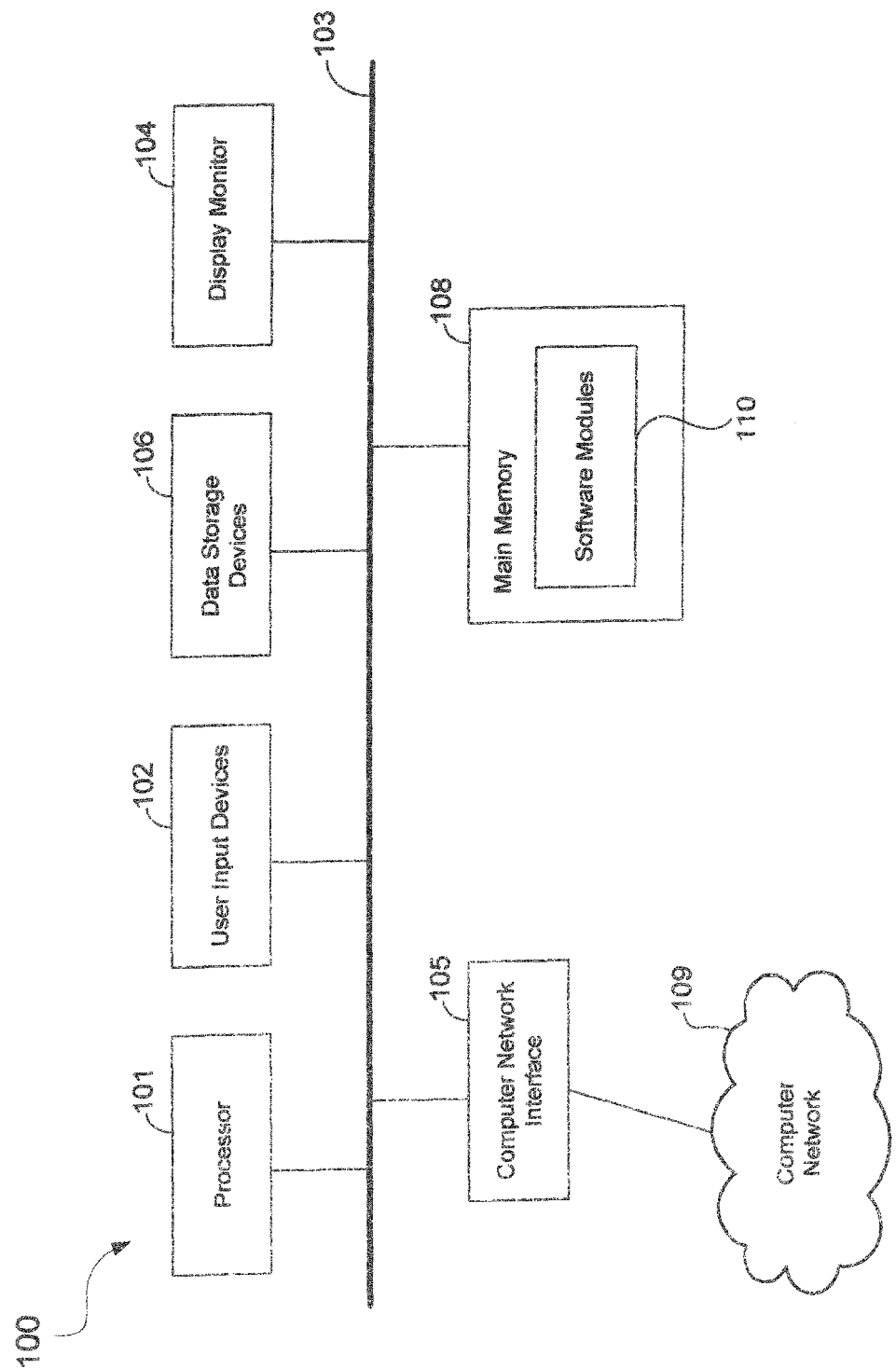
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer 202 or security server computer 204 (see FIG. 2), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may comprise computer-readable program code (i.e., software) components of a client computer 202, a web server 230, and/or security server computer 240, for example. The software modules 110 may be loaded from the data storage device 106 to the main memory 108 for execution by the processor 101.

Figure 2:
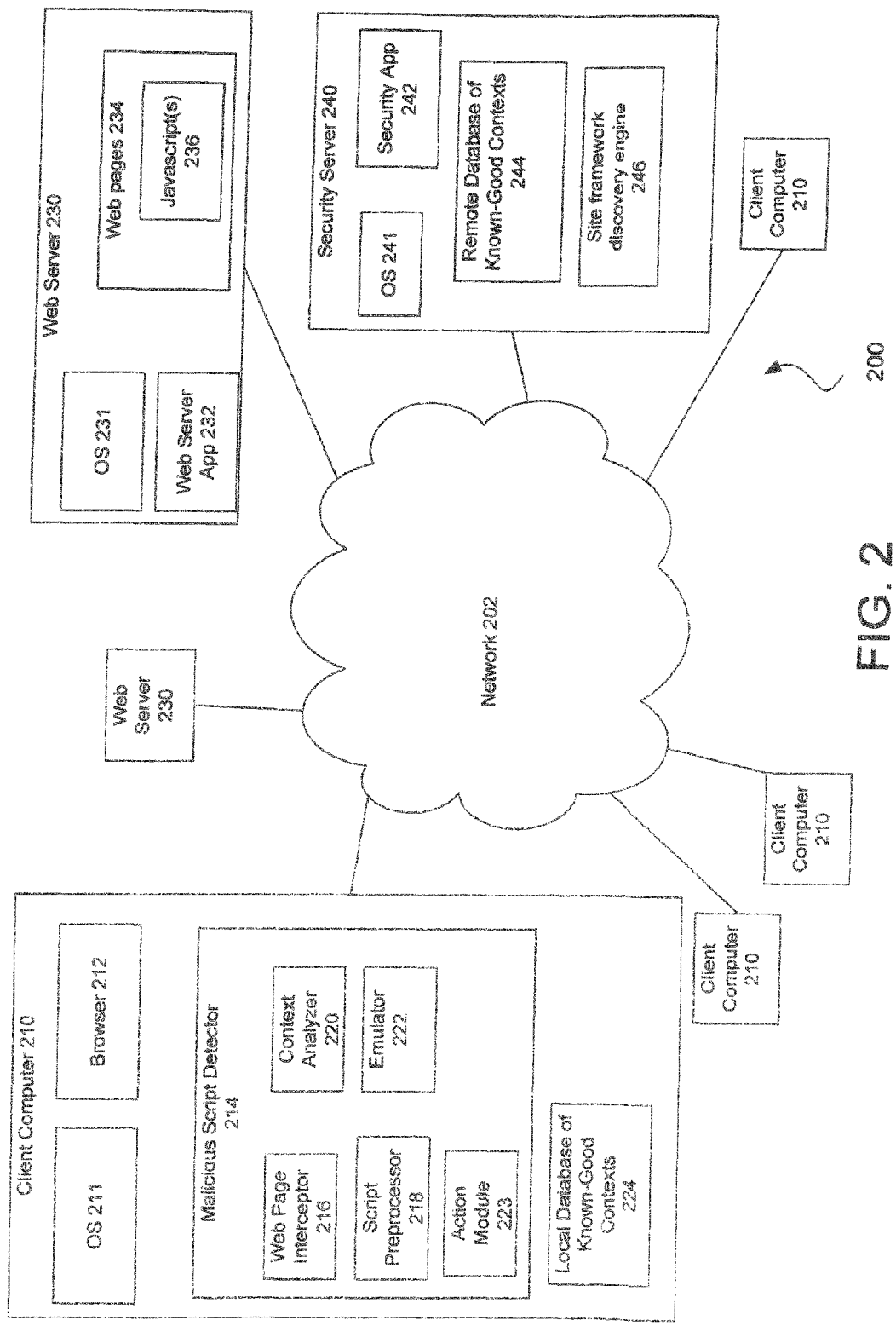
FIG. 2 schematically shows an apparatus at a client computer for detecting malicious scripts in accordance with an embodiment of the present invention.

FIG. 2 schematically shows a network system 200 including an apparatus for detecting malicious scripts in accordance with an embodiment of the present invention. In the example of FIG. 2, multiple client computers ("clients") 210 and a plurality of web server computers ("web servers") 230 are interconnected via a data network 202. In addition, the network system 200 may include a security server computer ("security server") 240.

Select components in a client 210, a web server 230, and a security server 240 are shown. As shown, the client 210 may include, among other components, an operating system ("OS") 211 and a web browser ("browser") 212, a malicious script detector 214, and a local URL/script database (DB) 224.

The malicious script detector 214 may be implemented as one or more executable software programs or components. As shown, the components of the malicious script detector 214 may include a web page interceptor 216, a script preprocessor 218, a context analyzer 220, an emulator 222, and an action module 223. The operations of the malicious script detector 214 and its components are described further below in relation to FIGS. 3 and 4.

The web server 230 may include an OS 231 and a web server application ("web server app") 232. The web server application 232 may respond to hyper text transfer protocol (HTTP) requests for web pages, normally specified by universal resource locators (URLs), by serving the requested web pages. Some of the web pages 234 may include javascript(s) 236 embedded therewith.

The security server 240 is an optional system component and is not necessary in certain embodiments of the invention. The security server 240 may include an OS 241, a security application ("security app") 242, and a remote database of known-good contexts 244.

Figure 3:
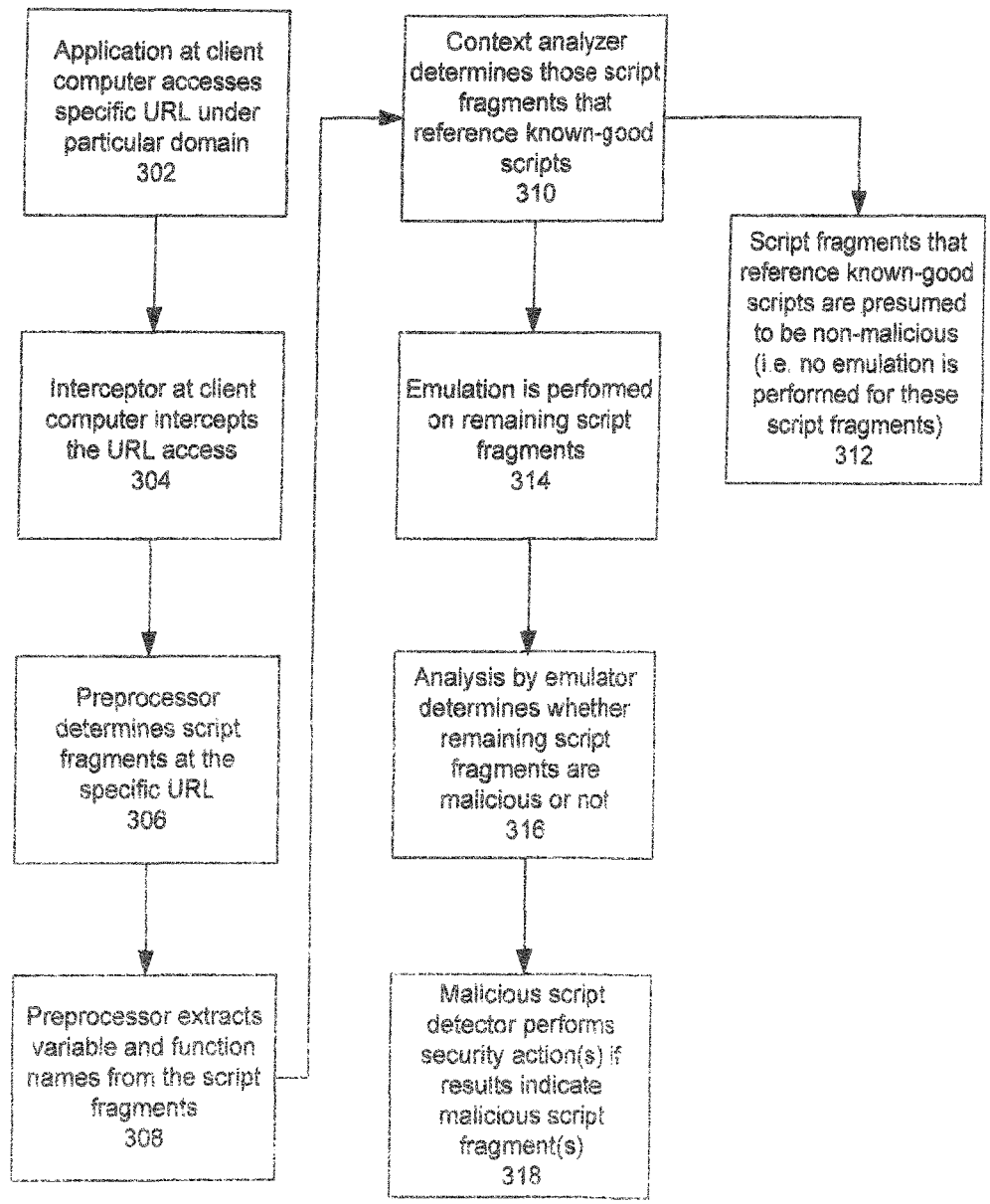
FIG. 3 is a flow chart of a method for malicious script detection using context-dependent script emulation in accordance with an embodiment of the present invention.
Figure 4:
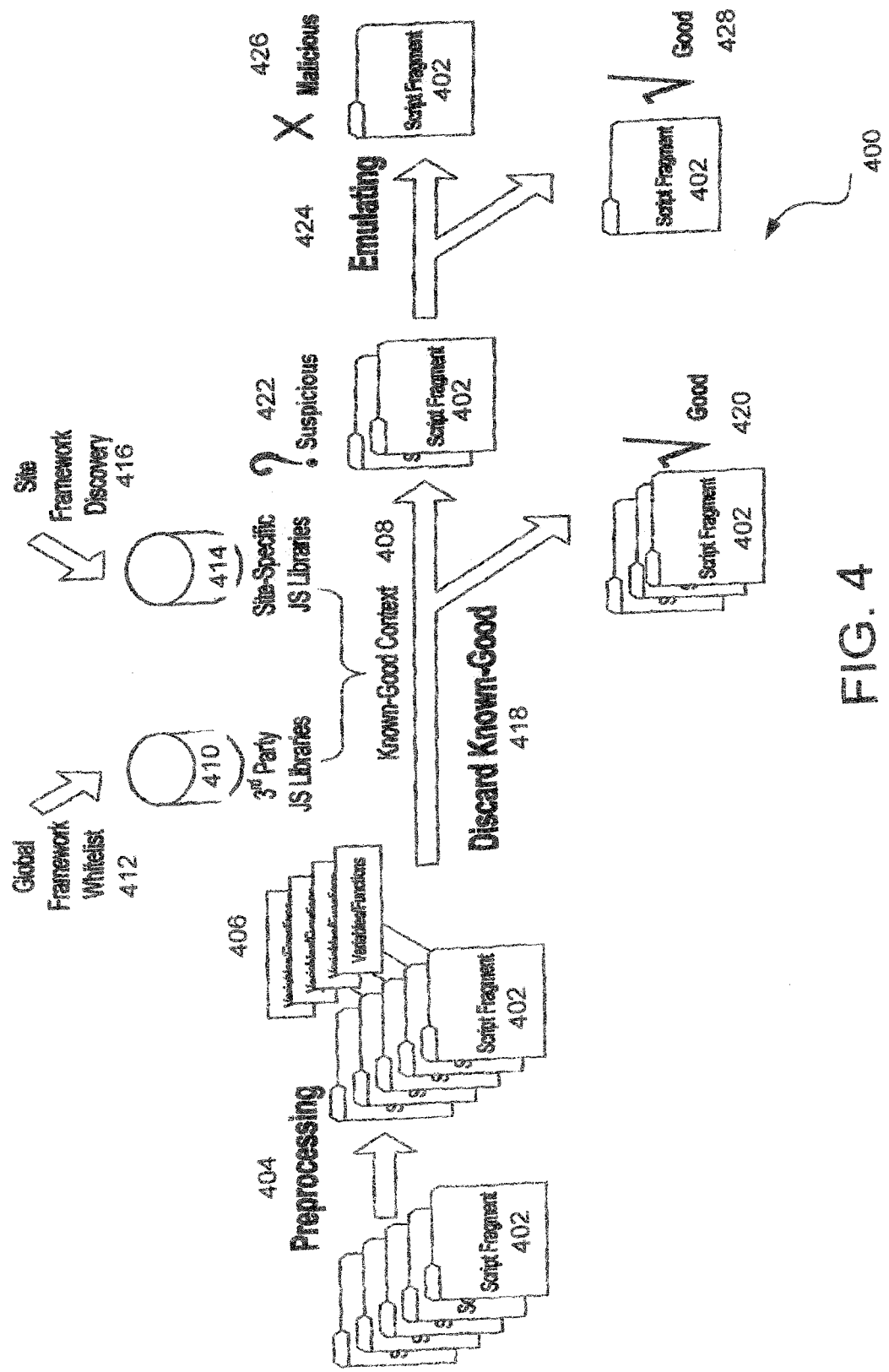
FIG. 4 is a schematic diagram illustrating a technique for malicious script detection using context-dependent script emulation in accordance with an embodiment of the present invention.

FIG. 3 is a flow chart of a method 300 for malicious script detection using context-dependent script emulation in accordance with an embodiment of the present invention. The method 300 may be performed within the system shown in FIG. 2. Aspects of the method 300 are also depicted in FIG. 4.

In the first block 302 of FIG. 3, an application at the client computer 210 accesses a URL. The application may be, for example, a web browser 212, but may be other types of applications with similar functionality as well. Accessing the URL typically involves sending out an HTTP request for that URL. For example, the URL may refer to a web page 234 with one or more javascript(s) 236 embedded therewith. The web server 230 for that web page may respond by sending the data for that web page in packets via the network 202 to the client computer 210.

In the second block 304, a web page interceptor 216 at the client computer 210 may intercept the web page data returned as a result of the URL access. The interceptor 216 is preferably configured to intercept the web page data before any javascripts embedded in the web page are executed.

In the third block 306, a script preprocessor 218 at the client computer 210 determines script fragments in the web page for that URL. The script fragments 402 are depicted in FIG. 4 and may correspond to sections of javascript code in the web page.

In the fourth block 308, the script preprocessor 218 analyzes or preprocesses the script fragments 402 so as to extract variable names and function names therefrom. This preprocessing 404 to extract variable/function names 406 is further depicted in FIG. 4.

In accordance with an embodiment of the invention, these variable and function names may be utilized for context reference checking. As the term is used herein, a context reference is a reference in a script fragment 402 to a variable or function which is defined elsewhere (i.e. externally or outside the web page itself).

In the fifth block 310 of FIG. 3, the context analyzer 220 determines whether or not script fragments 402 in the web page reference known-good scripts. In one implementation, the context analyzer 220 checks the variable/function names 406 of the script fragments 402 against a local database of known-good contexts 224. This local database 224 may be updated periodically by downloading updates from a remote database of known-good contexts 244 at a security server 240. This checking 408 of the script fragments 402 for known-good context is illustrated in FIG. 4.

As depicted in FIG. 4, the local database of known-good contexts 224 may include identifying information (such as the URLs) of legitimate third-party javascript libraries 410 and identifying information (such as the URLs) of legitimate site-specific javascript libraries 414. For example, the identifying information for these javascript libraries (410 and 414) may be retrieved and updated from a remote database of known-good contexts 244 at the security server 240. In one embodiment, the security server 240 may obtain the identifying information of third-party javascript libraries 410 from a global framework whitelist 412 and may obtain the identifying information of the site-specific javascript libraries 414 by site framework discovery 416. The site framework discovery 412 may be performed by a site framework discovery engine 246 at the security server 240.

A first example of a context reference to a legitimate third-party javascript library is as follows.

<script src="http://ortho.douban.com/js/packed_jquery0.js"></script>

In this example, the above-referenced "JQuery" library may have been predetermined to be a legitimate widely-used javascript library which is known to be non-malicious.

A second example of a context reference to a legitimate third-party javascript library is as follows.

<script src=http://a.alimama.cn/inf.js type=text/javascript></script>

In this case, the above-referenced "alimama" site may have been predetermined to be a legitimate advertisement exchange site which is known to be non-malicious.

An example of a context reference to a legitimate site-specific library is as follows <script type="text/javascript" src="http://www.taobao.com/ . . . /recommend_list.js?t=20080805"></script>

In this case, the above-referenced "recommend_list" script at the specified "www.taobao.com" site may have been predetermined to be a legitimate site-specific library which is known to be non-malicious.

As shown in the sixth block 312 of FIG. 3, script fragments 402 that reference known-good scripts may be presumed to be non-malicious. In accordance with an embodiment of the invention, no emulation is performed for these script fragments. In other words, as shown in FIG. 4, the script fragments 402 that are known to be "good" 420 may be discarded 418 in that they need not be subject to further anti-malware analysis.

As shown in the seventh block 314, emulation is performed on the remaining script fragments. In other words, as shown in FIG. 4, those script fragments 402 that do not reference known-good scripts may be considered to be suspicious 422 and provided to the emulator 222 for emulation 424 and further analysis.

Per the eighth block 316, the analysis by the emulator 222 determines whether these remaining script fragments are malicious or not. The analysis may use heuristic rules to analyze the actions (or "behavior") of the script fragments. The results of the analysis may indicate, for example, that a script contains malicious code 426, or that the script appears to be benign ("good") 428. If malicious code is indicated, then the results may also indicate the type of the malicious code or otherwise identify the malicious code.

Finally, in the ninth block 318, if the results of the emulation-based analysis indicates one or more malicious script fragment(s), then the action module 223 of the malicious script detector 214 may perform one or more security action(s). The security action(s) performed may depend on the type or identity of the malicious code. For example, the security action(s) may involve blocking the execution of the script(s) with malicious code. Alternatively, or in addition, a message may also be displayed to notify the user of the malicious script(s). Furthermore, a user and/or administrator may also be notified (for example, by displaying a message on a monitor) that malicious code in the web page has been detected.

Experimental analysis by the applicants has determined that the inventive technique disclosed herein is surprisingly effective in improving the performance of the malicious script detector. In fact, the performance is substantially improved such that it becomes practical to perform the malicious script detection at the client computer. In contrast, conventional techniques using emulation consume a large amount of resources and perform so slowly that implementation on the client side becomes prohibitive.

While specific embodiments of the present invention have been provided, it is to be understood that these embodiments are for illustration purposes and not limiting. Many additional embodiments will be apparent to persons of ordinary skill in the art reading this disclosure.

The invention claimed is:

1. A computer-implemented process for detecting malicious scripts at a client computer, the process comprising:
   requesting and receiving by the client computer a web page comprising script fragments from a web server;
   intercepting the web page before any script fragment in the web page is executed by the client computer;
   checking variables and function names present in the script fragments against a local database of known-good contexts including uniform resource locators (URLs) of legitimate third-party javascript libraries and URLs of site-specific javascript libraries, wherein the local database is updated periodically by downloading from a remote database residing on a dedicated security server, and wherein the security server obtains the third-party javascript libraries from a global framework whitelist and performs site framework discovery to obtain the site-specific javascript libraries;
   classifying a script fragment in the script fragments as a known-good good script fragment and non-malicious, and then discarding the script fragment from the script fragments if a known-good context is present in the script fragment; and
   performing emulation only on remaining script fragments to determine if the remaining script fragments are malicious or non-malicious.

2. The computer-implemented process of claim 1, further comprising:
   blocking a malicious script fragment in the remaining script fragments from being executed.

3. A non-transitory computer-readable medium comprising instructions stored thereon, that when executed by a processor of a computer cause the computer to perform the steps of:
   requesting and receiving by, the computer a web page comprising script fragments from a web server;
   intercepting the web page before any script fragment in the web page is executed by the processor of the computer;
   checking variables and function names present in the script fragments against a local database of known-good contexts including uniform resource locators (URLs) of legitimate third-party javascript libraries and URLs of site-specific javascript libraries, wherein the local database is updated periodically by downloading from a remote database residing on a dedicated security server, and wherein the security server obtains the third-party javascript libraries from a global framework whitelist and performs site framework discovery to obtain the site-specific javascript libraries;
   classifying a script fragment in the script fragments as a known-good script fragment and non-malicious, and then discarding the script fragment from the script fragments if a known-good context is present in the script fragment; and
   performing emulation only on remaining script fragments to determine if the remaining script fragments are malicious or non-malicious.

4. The non-transitory computer-readable medium of claim 3, wherein the instructions when executed by the processor further cause the computer to perform the step of blocking a malicious script fragment in the remaining script fragments from being executed.

* * * * *